United States Patent
Wilson et al.

(10) Patent No.: US 11,833,978 B1
(45) Date of Patent: Dec. 5, 2023

(54) SENSING SYSTEM WITH SENSOR WINDOW HAVING A SUPERHYDROPHOBIC SURFACE

(71) Applicants: James R. Wilson, Cupertino, CA (US); Arthur Y. Zhang, San Jose, CA (US)

(72) Inventors: James R. Wilson, Cupertino, CA (US); Arthur Y. Zhang, San Jose, CA (US)

(73) Assignee: APPLE INC., Cupertino, CA (US)

( * ) Notice: Subject to any disclaimer, the term of this patent is extended or adjusted under 35 U.S.C. 154(b) by 140 days.

(21) Appl. No.: 17/475,448

(22) Filed: Sep. 15, 2021

Related U.S. Application Data

(60) Provisional application No. 63/082,722, filed on Sep. 24, 2020.

(51) Int. Cl.
*B60R 11/04* (2006.01)
*B60S 1/56* (2006.01)
*G02B 27/00* (2006.01)
*B60R 11/00* (2006.01)

(52) U.S. Cl.
CPC ............ *B60R 11/04* (2013.01); *B60S 1/56* (2013.01); *G02B 27/0006* (2013.01); *B60R 2011/004* (2013.01)

(58) Field of Classification Search
None
See application file for complete search history.

(56) References Cited

U.S. PATENT DOCUMENTS

| | | | | |
|---|---|---|---|---|
| 8,899,761 B2 * | 12/2014 | Tonar | ............... | H04N 23/52 359/511 |
| 9,221,076 B2 * | 12/2015 | Simpson | ............... | C09D 7/62 |
| 9,771,656 B2 * | 9/2017 | Aytug | ............... | C23C 30/00 |
| 10,525,937 B2 * | 1/2020 | Zhao | ............... | B60S 1/56 |
| 2011/0073142 A1 * | 3/2011 | Hattori | ............... | B60S 1/52 134/198 |
| 2011/0181725 A1 * | 7/2011 | Matsuura | ............... | G03B 17/02 348/148 |
| 2012/0103960 A1 * | 5/2012 | Bressand | ............... | H05B 3/84 219/203 |
| 2012/0119104 A1 * | 5/2012 | Arslan | ............... | B60R 11/04 156/60 |
| 2012/0243093 A1 * | 9/2012 | Tonar | ............... | H10N 30/20 359/507 |
| 2016/0311379 A1 * | 10/2016 | Matsumoto | ............... | B60J 1/2094 |

(Continued)

FOREIGN PATENT DOCUMENTS

CA 2833843 A1 * 5/2014
CN 214346082 U * 10/2021
(Continued)

*Primary Examiner* — Fekadeselassie Girma
(74) *Attorney, Agent, or Firm* — Young Basile Hanlon & MacFarlane, P.C.

(57) ABSTRACT

A sensing system that includes an optical sensor and a sensing window. The optical sensor is configured to sense with electromagnetic radiation an environment. The sensing window is coupled to a structure, such that the electromagnetic radiation passes therethrough from the environment to the optical sensor to be sensed thereby. The sensing window includes an inner side that faces toward the optical sensor and an outer side that faces away from the optical sensor. The outer side includes a superhydrophobic surface that is in fluidic communication with the environment.

21 Claims, 5 Drawing Sheets

(56) References Cited

U.S. PATENT DOCUMENTS

| | | | | |
|---|---|---|---|---|
| 2017/0285222 A1* | 10/2017 | Hsu | .......................... | G02B 1/18 |
| 2018/0113331 A1* | 4/2018 | Wang | .................... | G02F 1/0102 |
| 2018/0335505 A1* | 11/2018 | Bretagnol | ................. | G02B 3/04 |
| 2018/0335622 A1* | 11/2018 | Trebouet | ............... | B60S 1/0848 |
| 2019/0162953 A1* | 5/2019 | Bretagnol | ............... | B08B 17/06 |
| 2019/0295391 A1* | 9/2019 | Watanabe | .............. | G03B 17/08 |
| 2019/0329737 A1* | 10/2019 | Bretagnol | ............... | B60R 11/04 |
| 2020/0017035 A1* | 1/2020 | Bretagnol | ................ | H04N 23/51 |
| 2020/0232895 A1* | 7/2020 | Herman | ................ | B60S 1/0818 |
| 2020/0254979 A1* | 8/2020 | Bretagnol | .............. | G03B 29/00 |

FOREIGN PATENT DOCUMENTS

| | | | | | |
|---|---|---|---|---|---|
| DE | 102017124828 | A1 | | 4/2018 | |
| EP | 2605043 | B1 | | 7/2014 | |
| EP | 3404482 | A1 * | 11/2018 | ............. | B60R 11/00 |
| EP | 3407591 | A1 * | 11/2018 | ........... | F16M 11/105 |
| JP | 5928656 | B2 | | 6/2016 | |
| WO | 2012091804 | A2 | | 7/2012 | |

* cited by examiner

US 11,833,978 B1

SENSING SYSTEM WITH SENSOR WINDOW HAVING A SUPERHYDROPHOBIC SURFACE

CROSS-REFERENCE TO RELATED APPLICATION(S)

This application claims priority to and the benefit of U.S. Provisional Patent Application No. 63/082,722, filed Sep. 24, 2020, the entire disclosure of which is incorporated by reference herein.

TECHNICAL FIELD

This disclosure relates to sensing systems and, in particular, optical sensing systems.

BACKGROUND

Automated control systems may be operated according to conditions of the environment, such as a public environment and obstacles therein. The conditions of the environment may be sensed with different sensing systems, which may include optical sensors that sense the environment with electromagnetic radiation, such as infrared light or visible light. However, debris, such as water-based debris (e.g., rain drops, snow, ice, mud) may interfere with the sensing system's ability to sense the environment.

SUMMARY

Disclosed herein are implementations of vehicles and sensor systems therefor.

In one implementation, a vehicle includes a vehicle body, a drive system, a sensing system, and a control system. The drive system is coupled to the vehicle body for propelling the vehicle. The sensing system includes a chassis, an optical sensor, and a sensing window. The chassis is coupled to the vehicle body. The optical sensor is coupled to the chassis and configured to sense with electromagnetic radiation an environment external to the vehicle body. The sensing window is coupled to the chassis, such that the electromagnetic radiation passes therethrough from the environment to the optical sensor to be sensed thereby. The sensing window includes an inner side that faces toward the optical sensor and an outer side that faces away from the optical sensor. The outer side includes a superhydrophobic surface that is in fluidic communication with the environment. The control system operates the drive system according to the optical sensor.

The superhydrophobic surface may have a contact angle with water of at least 150 degrees. The sensing window may include a substrate that is substantially transparent to the electromagnetic radiation in a sensing range in which the optical sensor senses the environment and that includes the outer side. The sensing system may be coupled to the vehicle body outside a passenger compartment of the vehicle body with the sensing window being separate from any window through which passengers may view the environment from the passenger compartment.

In one implementation, a sensing system is provided for sensing an environment exterior to a vehicle. The sensing system includes a housing coupleable to the vehicle, an optical sensor, and a sensing window. The optical sensor is coupled to the housing for receiving electromagnetic radiation to sense the environment. The sensing window is coupled to the housing and the electromagnetic radiation passes therethrough to be received by the optical sensor. The sensing window includes a first surface that faces the optical sensor and a second surface having a superhydrophobic surface that faces the environment.

In one implementation, an optical sensing system includes a chassis, an optical sensor coupled to the chassis, a sensing window coupled to the chassis, and a plurality of films that are coupled to each other to form a stack that is coupled to an outer side of the sensing window. Electromagnetic radiation passes through the sensing window from the environment to the optical sensor. Each of the films includes a superhydrophobic surface that faces away from the optical sensor toward the environment. The superhydrophobic surface of an outermost one of the films is exposed to the environment, and the outermost one of the films is removable from an underlying one of the films such that the superhydrophobic surface of the underlying one of the films becomes exposed to the environment.

DETAILED DESCRIPTION

Disclosed herein are a vehicle and optical sensing systems therefor and by which the vehicle is operated. The optical sensing system senses the environment with electromagnetic radiation and includes a sensor window having a superhydrophobic surface, which functions to prevent retention of water and other water-based debris thereon that might otherwise interfere with sensing the environment with the optical sensing system.

Figure 2:
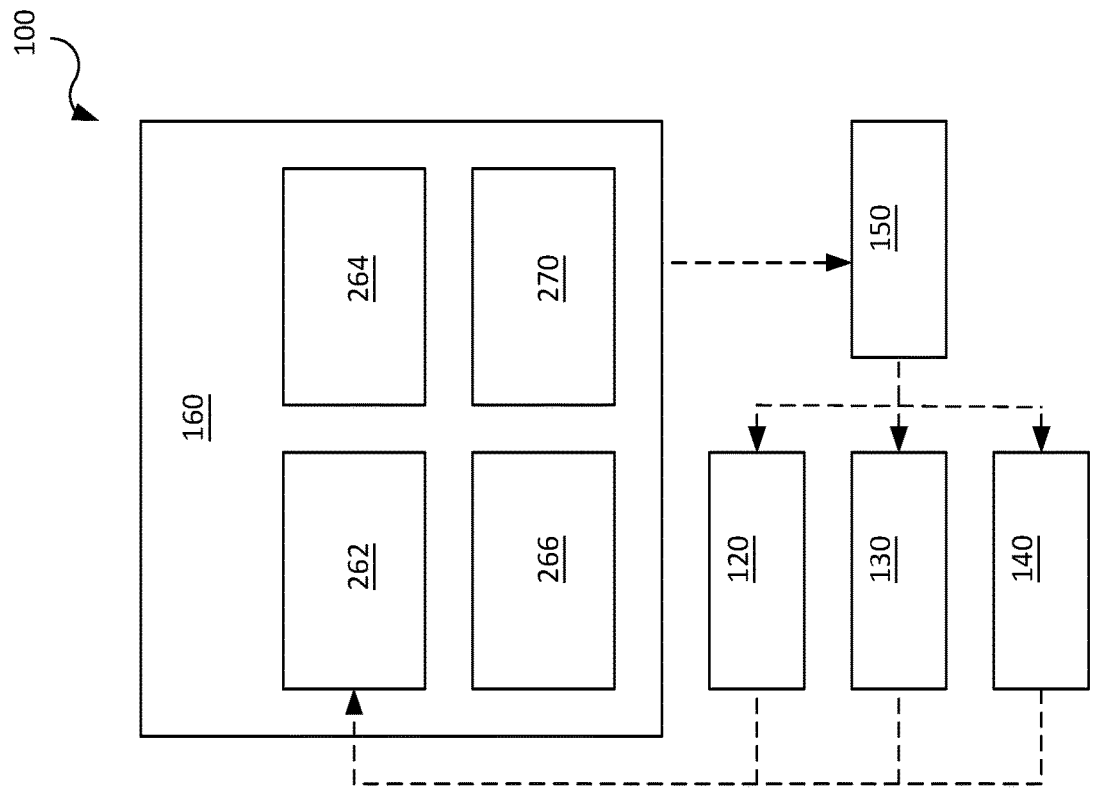
FIG. 2 is another schematic view of the vehicle of FIG. 1.
Figure 1:
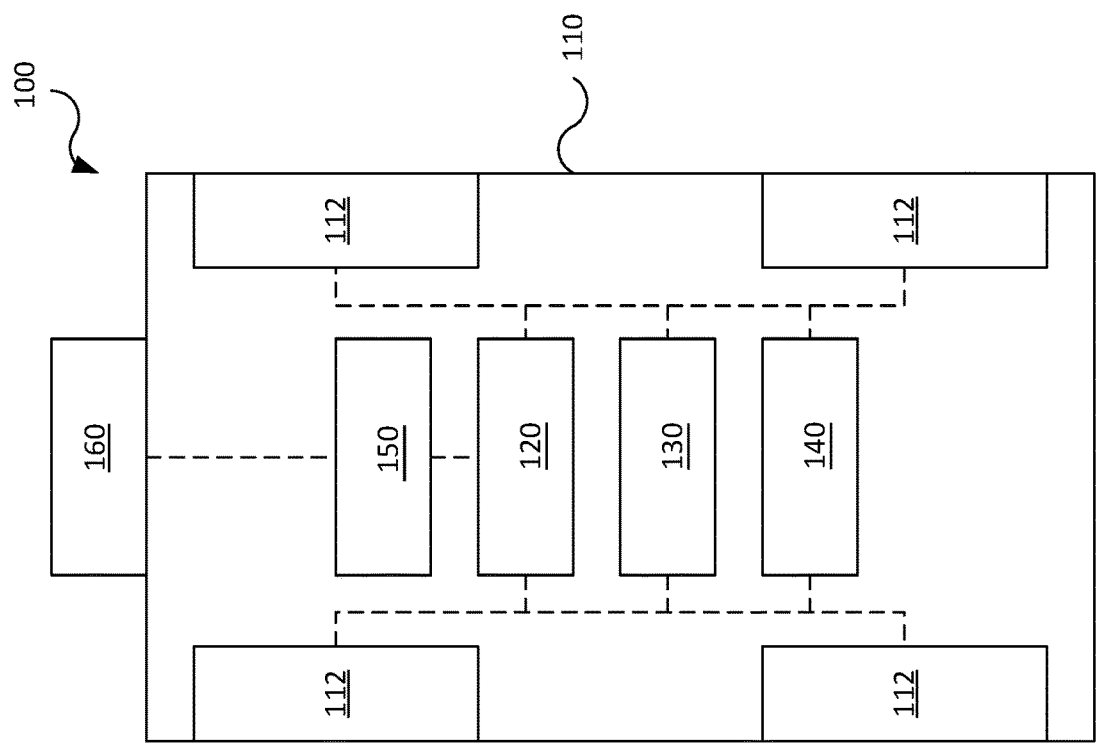
FIG. 1 is a schematic view of a vehicle.

Referring to FIGS. 1 and 2, a vehicle 100 generally includes a body 110 and wheels 112 coupled to the vehicle body 110, along with a drive system 120, a braking system 130, and a steering system 140 that are operatively coupled to the wheels 112 to move the vehicle 100. More particularly, the drive system 120 is operatively coupled to the wheels 112 to propel the vehicle along a surface, for example, including an electric motor that is coupled to the wheels 112 via a gearbox and a drive shaft to cause rotation thereof. The braking system 130 is operatively coupled to the wheels 112 to decelerate the vehicle 100, for example, including friction brakes (e.g., brake calipers that press brake pads against brake rotors) that are motor and/or hydraulically operated to slow rotation of the wheels 112. The steering system 140 is operatively coupled to the wheels 112 to steer (e.g., change lateral direction of) the vehicle 100 over the surface, for example, including a rack-and-pinion steering rack that is operated by a motor to pivot front ones of the wheels 112 about generally vertical axes.

The vehicle 100 also includes a control system 150 and one or more sensing systems 160. The control system 150 is configured to operate the drive system 120, the braking system 130, and the steering system 140 to navigate the vehicle 100 along the surface, which may be a public roadway. More particularly, the one or more sensing systems 160 are configured to monitor the vehicle 100 (e.g., the drive system, the braking system 130, and the steering system 140) and the environment thereof, while the control system 150 operates the drive system 120, the braking system 130, and the steering system 140 according to the sensing system 160 (e.g., according to the information about the environment sensed and output thereby).

The control system 150 includes one or more controllers that are in wired or wireless communication with the drive system 120, the braking system 130, the steering system 140, and the sensing systems 160 to receive information therefrom (e.g., via sensor signals) and provide instructions thereto (e.g., via control signals). Controllers associated with each system (e.g., the drive system 120) or components thereof (e.g., the motor of the drive system 120) may be considered part of the control system 150.

Figure 3:
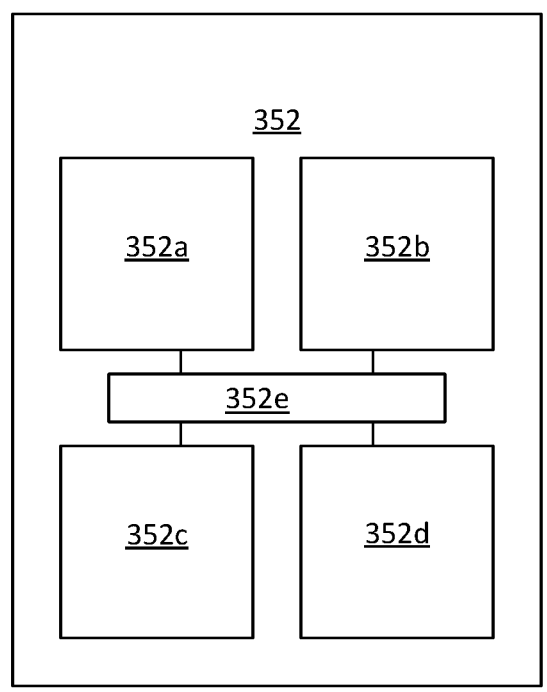
FIG. 3 is a schematic view of a hardware configuration for a controller of the vehicle of FIG. 1.

Referring to FIG. 3, an example hardware configuration for a controller 352 of the control system 150 is illustrated. The controller 352 generally includes a processor 352a, a memory 352b, a storage 352c, a communications interface 352d, and a bus 352e by which the other components of the controller 352 are in communication with each other. The processor 352a may be any suitable processing device, such as a central processing unit, capable of executing stored instructions (e.g., according to software programming). The memory 352b is a high-speed, volatile storage device, such as random-access memory (RAM). The storage 352c is a non-volatile storage device that stores instructions (e.g., the software programming) to be executed by the processor 352a and other information (e.g., data). The communications interface 352d allows the controller 352 to receive signals from other components (e.g., sensor signals sensor systems) and provide signals thereto (e.g., control signals to control the various systems of the vehicle 100) according to the stored instructions. While one example hardware configuration is described herein for the one or more controllers 352 of the control system 150, it should be understood that the controllers 352 may have any other suitable configuration capable of performing the functions and methods described herein.

Referring again to FIGS. 1 and 2, the sensing systems 160 include an optical sensing system 270, and may further include one or more vehicle sensing systems 262, one or more position sensing systems 264, one or more passenger sensing systems 266, and any other suitable sensing systems. The vehicle sensing systems 262 are configured to sense various conditions of the vehicle 100, such as the drive system 120, the braking system 130, and the steering system 140, and may form or be considered part of such other systems (e.g., the drive system 120 may include a sensing system for monitoring conditions thereof, such as speed and temperature). The position sensing system 264 is configured to sense the position of the vehicle 100, for example, being or including a global positioning system (GPS) by which absolute position and/or velocity of the vehicle 100 may be determined and/or correlated to other information (e.g., mapping information). The passenger sensing system 266 is configured to sense various conditions related to passengers of the vehicle 100, such as number, weight, and/or position of passengers in the vehicle body 110 (e.g., a passenger compartment) of the vehicle 100.

Each of the optical sensing systems 270 is configured to optically sense the environment of the vehicle 100 for navigating the vehicle 100. The optical sensing system 270 may, for example, be used to detect roadways along which the vehicle 100 travels, static and/or dynamic instructions from the environment (e.g., signs and/or signals), and/or obstacles. The optical sensing system 270 may part of the position sensing system 264.

Figure 4A:
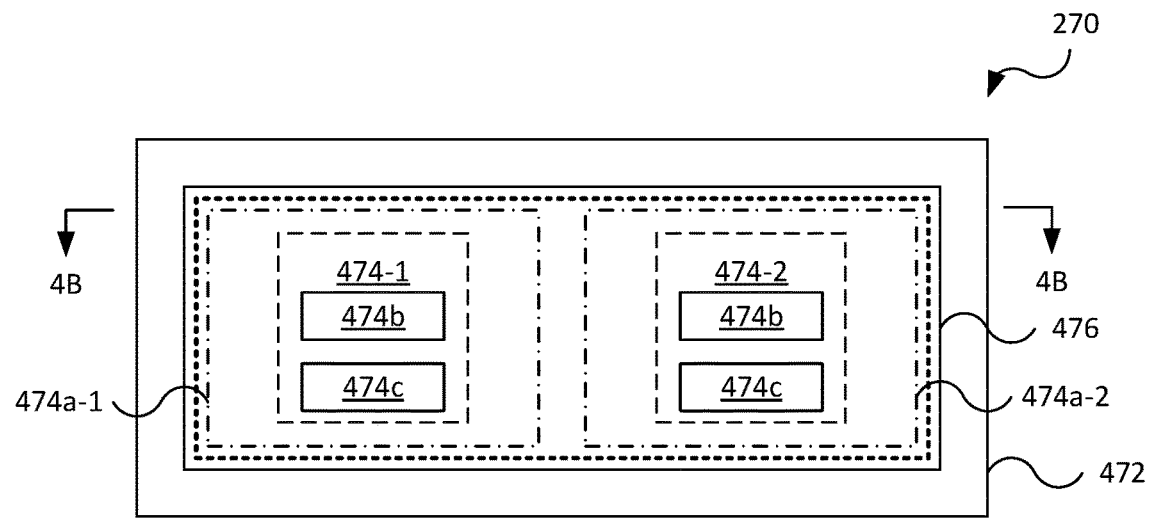
FIG. 4A is a front view of an optical sensing system of the vehicle.
Figure 4B:
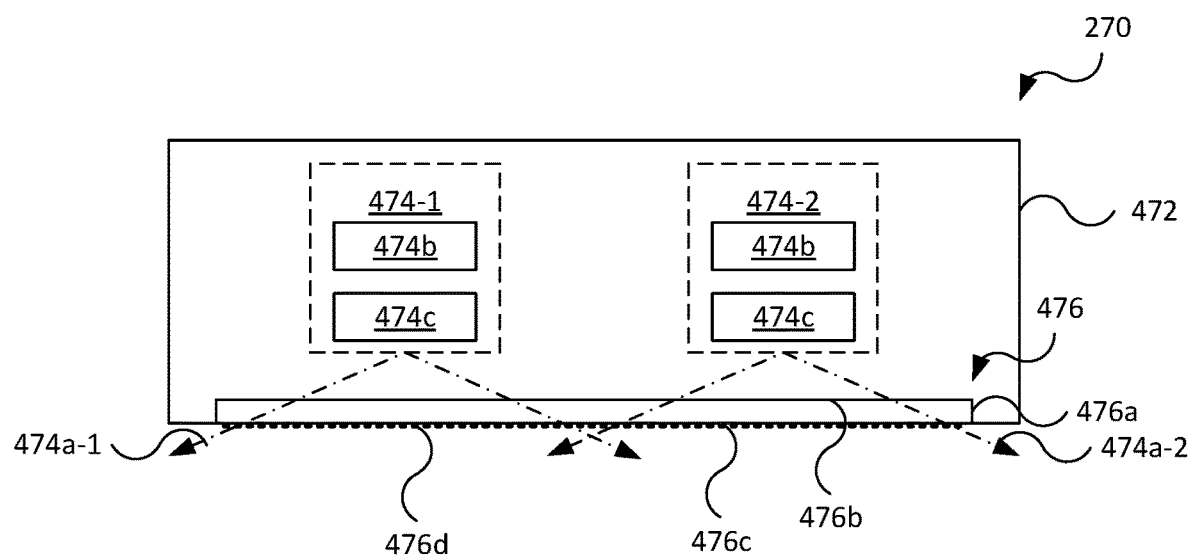
FIG. 4B is a cross-sectional view of the optical sensing system of FIG. 4A taken along line 4B-4B.

Referring to FIGS. 4A and 4B, one or more of the optical sensing systems 270 generally includes a chassis 472, one or more optical sensors 474 coupled to the chassis 472, and a sensing window 476.

The chassis 472 may be any structure suitable for supporting the optical sensor 474 relative to the vehicle body 110 of the vehicle 100 for sensing the environment thereof. For example, the chassis 472 may be or include a housing that defines a cavity that contains the optical sensor 474. The chassis 472 may further seal the optical sensor 474 therein for protection from environmental water and debris. The chassis 472 is in turn coupled to the vehicle body 110 of the vehicle 100. For example, the chassis 472 may be coupled to the vehicle body 110 and be positioned outside any passenger compartment formed by the vehicle body 110. As a result, the sensing window 476 is separate from any other window that defines the passenger compartment and through which passengers may view the environment from the passenger compartment. Positioning of the optical sensing system 270 outside the passenger compartment is depicted schematically in FIG. 1 with the sensing system 160 being coupled to an exterior surface of the vehicle body 110. It should be noted, however, that various others of the sensing systems 262, 264, 266 may be arranged inside the passenger compartment.

The one or more optical sensors 474 (e.g., 474-1, 474-2, etc.) are coupled to the chassis 472. For example, the optical sensor 474 may be fixedly or movably coupled to the chassis 472 within the cavity thereof. The one or more optical sensors 474 are configured to sense the environment external to the vehicle body 110 of the vehicle 100 (e.g., surrounding the vehicle 100) using electromagnetic radiation in one or more of the infrared spectrum, the visible light spectrum, the infrared spectrum, or subportion thereof. The frequency range of the electromagnetic radiation in which the optical sensor 474 senses the environment may be referred to as a sensing range.

The optical sensor 474 includes an optical sensing device 474b and may further include an optical illuminating device 474c. The optical sensing device 474b is configured to sense electromagnetic radiation from the environment in the sensing range and convert the electromagnetic radiation into electrical signals send to the control system 150 and containing information about the sensed electromagnetic radiation. The optical sensing device 474b may be any suitable type of sensing device, such as an image sensor that is sensitive to electromagnetic radiation in the sensing range. The optical sensing device 474b may be considered to include any optical components, such as refractive lenses and/or filters, associated therewith.

The optical illuminating device 474c is configured to emit electromagnetic radiation in the sensing range. The optical illuminating device 474c emits the electromagnetic radiation into the environment, which reflects off objects in the environment and is then sensed by the optical sensing device 474b. In one example, the optical sensing device 474b and the optical illuminating device 474c are cooperatively configured to sense and emit, respectively, electromagnetic radiation in the infrared spectrum (e.g., the sensing range having a bandwidth of 1000, 500, or 200 Hz or less). The optical illuminating device 474c may, for example, include one or more light-illuminating diodes (LED) or other component suitable for illuminating the electromagnetic radiation. The optical illuminating device 474c may be considered to include any optical components, such as refractive lenses and/or filters, associated therewith which may be the same or different optical components as those of the optical sensing device 474b. In another example, the optical sensor 474 is a light detection and ranging system (LIDAR) in which case the optical illuminating device 474c may be a laser.

The one or more optical sensors 474 are in electrical communication with the control system 150, which may control operation of the optical sensors 474 and/or may receive sensor signals therefrom. The sensor signals include information about the environment, as sensed by the optical sensors 474 (e.g., image information), which is processed by the control system 150. For example, the control system 150 may process the sensor signals to identify, characterize, and/or predict movement of objects in the environment. The control system 150 may then determine a vehicle path according to the objects, and output control signals to the other vehicle systems for moving the vehicle 100 along the vehicle path.

Multiple optical sensors 474 may be coupled to the same chassis 472, for example, being positioned in a common cavity thereof. In such case, each of the optical sensors 474 may be of the same or different type (e.g., having the same or different sensing range) and/or may be pointed in the same or different directions. For example, in one example, one of the optical sensors 474-1 has a sensing range in the infrared spectrum, while a second of the optical sensors 474-2 has a different sensing range that is in the visible light spectrum.

Each of the optical sensors 474 has a field of view 474a (e.g., 474a-1, 474a-2, etc.) from which the optical sensor 474 senses the electromagnetic radiation. The field of view 474a may, for example, be defined as an angular range in one or more planes (e.g., a horizontal plane as shown). The field of view 474a is illustrated in dash-dot lines in FIGS. 4A and 4B.

The sensing window 476 is coupled to the chassis 472 and arranged between the optical sensor 474 and the environment, so as to protect the optical sensor 474 from water, debris, and other objects in the environment. The sensing window 476 includes a substrate 476a having an inner side 476b that faces toward the optical sensor 474 and an outer side 476c that faces the environment. The sensing window 476, including the substrate 476a thereof, is substantially transparent to the electromagnetic radiation in the sensing range, allowing for receipt of electromagnetic radiation from the environment by the optical sensing device 474b and emission of electromagnetic radiation from the optical illuminating device 474c, if provided, to the environment. Substantially transparent refers to optical transmission of the electromagnetic radiation in the sensing range of greater than 80% (e.g., 85%, 90%, or more) therethrough.

The substrate 476a of the sensing window 476 may, for example, be formed of glass, such as a silica glass, or other material transparent to electromagnetic radiation in the sensing range. The substrate 476a may be substantially planar as shown or may be curved. In the case of the substrate 476a being curved, the field of view 474a of the optical sensor 474 may extend through a curved portion of the substrate 476a.

The sensing window 476 may include one or more coatings (not illustrated) on the inner side 476b of the substrate 476a, such as an anti-reflective coating and/or a reflective coating having optical properties that correspond to the sensing range of the one or more sensors 474 (e.g., having high transmission of electromagnetic radiation in the sensing range and/or high reflectance and/or absorption of electromagnetic radiation outside the sensing range). In the case of multiple optical sensors 474 having different sensing ranges, different optical coatings may be provided in different regions of the inner side 476b of the substrate 476a that correspond to the fields of view thereof (e.g., 474a-1, 474a-2) and which have different optical properties corresponding to the sensing ranges (e.g., anti-reflection, high transmission, high reflectance, and/or high absorption, as referenced above).

The sensing window 476 further includes a superhydrophobic surface 476d on the outer side 476c of the substrate 476a. The superhydrophobic surface 476d is illustrated schematically in heavy dot-dot lines in FIGS. 4A and 4B. The superhydrophobic surface 476d is exposed to the environment by being in fluidic communication therewith (e.g., air, water, and debris in the environment and outside the vehicle body 110 may contact the superhydrophobic surface 476d). The superhydrophobic surface 476d functions to hinder or prevent retention of water or water-based debris (e.g., rain, snow, ice, mud) to the outer side 476c of the sensing window 476 (e.g., from surface tension) and/or facilitate easier removal therefrom (e.g., from gravity and/or wind as the vehicle 100 moves). Such water-based debris, including water itself, may function to filter out (e.g., block) and/or distort electromagnetic radiation in various bands of the sensing range in which the optical sensor 474 is configured to sense the environment. For example, water may filter certain frequencies of infrared light, effectively creating blind spots for optical sensors configured to sense the environment with electromagnetic radiation only in that spectrum. Due to inclusion of the superhydrophobic surface 476d, the optical sensing system 270 and the vehicle 100 may not include an external device for removing debris from the outer side 476c of the sensing window 476, which might otherwise remove such debris mechanically (e.g., wiping) or by blowing a fluid (e.g., air or cleaning solution).

As used herein, the term superhydrophobic refers to surfaces that form a contact angle with water of 150 degrees or more. In general, the superhydrophobic surface 476d includes micro- and/or nano-scale texture that may be provided by structures formed in a material or by characteristic properties of the material itself, which provide the superhydrophobic properties (e.g., the contact angle).

The superhydrophobic surface 476d may substantially encompass the field of view 474a of the one or more optical sensors 474, such that all of the electromagnetic radiation received from the environment by the optical sensing device 474b passes through the superhydrophobic surface 476d. In one example, the superhydrophobic surface 476d is provided over a substantial entirety of the outer side 476c of the substrate 476a (e.g., 85%, 90%, 95%, 98%, or more of the surface area thereof).

In as still further example, the superhydrophobic surface 476d may be provided over less than a substantial entirety of the outer side 476c of the substrate 476a. For example, the optical sensing system 270 may include two or more of the optical sensors 474 that have different sensing ranges, the first of which may coincide with frequency bands at which water-based debris may filter electromagnetic radiation (e.g., certain bands of infrared light). In such case, the field of view 474a of the first optical sensor 474 having a sensing range filtered by water passes through the superhydrophobic surface 476d, while the field of view 474a of the second optical sensor 474 passes through portions of the sensing window 476 that does not include the superhydrophobic surface 476d.

In the case of the substrate 476a being curved, the superhydrophobic surface 476d may be provided on the outer side 476c of a curved portion of the substrate 476a.

The superhydrophobic surface 476d of the sensing window 476 may be provided in different manners. In one example, the superhydrophobic surface 476d is formed on the outer side 476c the substrate 476a (e.g., the substrate 476a includes the texture), such as with an etching process. In another example, the superhydrophobic surface 476d is formed by a coating that is coupled to the outer side 476c of the substrate 476a.

Figure 5:
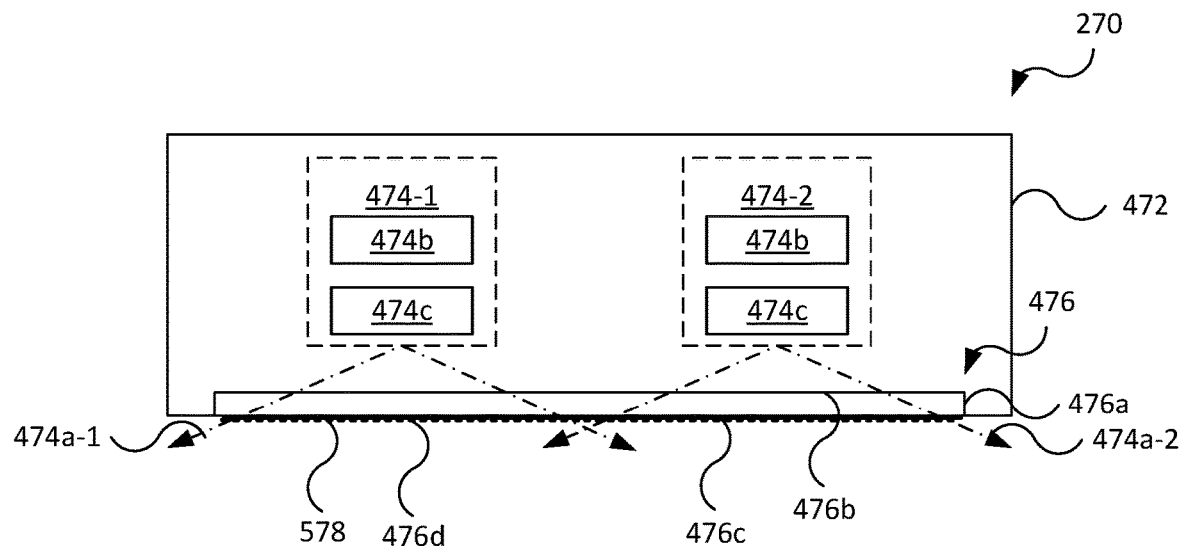
FIG. 5 is a top view of a variation of the optical sensing system of FIG. 4A.

In another example shown in FIG. 5, the superhydrophobic surface 476d is provided by a film 578 (e.g., another substrate) that includes the superhydrophobic surface 476d formed therein or provided as a coating coupled thereto (e.g., as described above with the substrate 476a). The film 578 is illustrated schematically in FIG. 5 as a heavy solid line. The film 578 may, for example, be formed from a polymeric material that is substantially transparent to electromagnetic radiation in the sensing range. The polymeric material of the film 578 may be more flexible than the material forming the substrate 476a of the sensing window 476.

Figure 6:
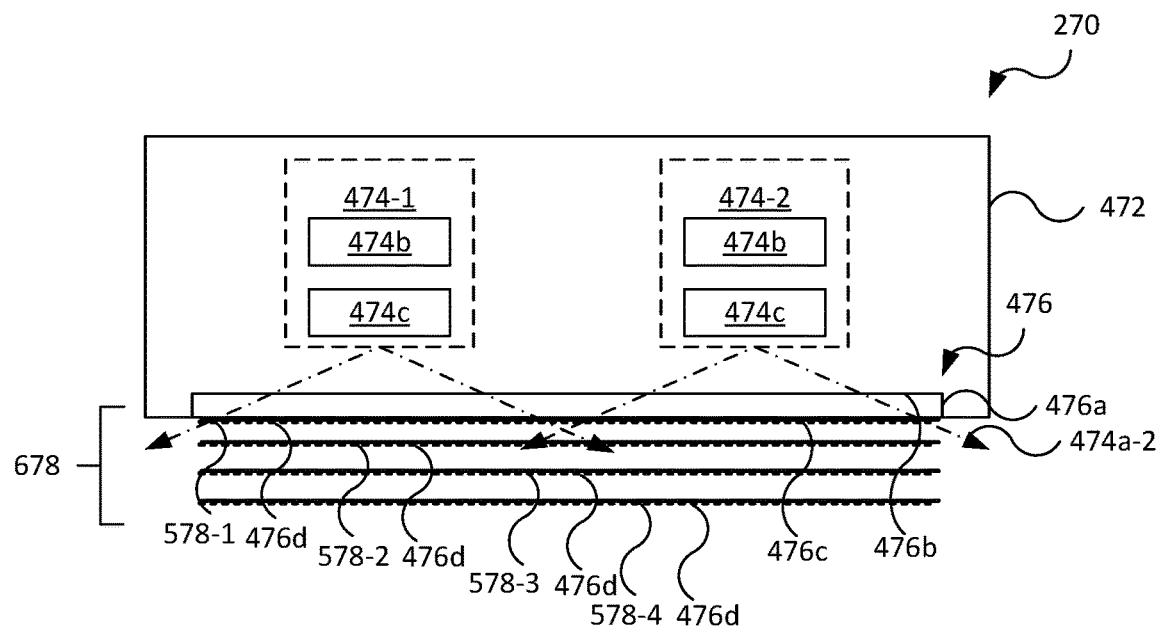
FIG. 6 is a top view of another variation of the optical sensing system FIG. 4A.

In a further example shown in FIG. 6, a stack 678 of the films 578 (e.g., numbered as 578-1, 578-2, etc.) may be layered together and coupled to the sensing window 476 to provide multiple of the superhydrophobic surfaces 476d. The films 578 of the stack 678 are illustrated in an exploded view, but it should be understood that each film 578 is coupled to and removable from an underlying one of the films 578 or the outer side 476c of the substrate 476a of the sensing window 476. In the stack, 678, the film 578 exposed to the environment is referred to as the outermost film 578 (see 578-1). Each of the other films 578 are referred to as underlying films (see 578-2, 578-3). Upon removal of the outermost film 578 from the stack 678, the underlying film 578 adjacent thereto becomes the outermost layer in succession. The outermost films 578 may be removed and discarded, for example, upon degradation of the superhydrophobic properties provided by the superhydrophobic surface 476d thereof (e.g., from mechanical and/or ultraviolet degradation), while the next underlying film 578 provides the superhydrophobic surface 476d for the sensing window 476.

Figure 7A:
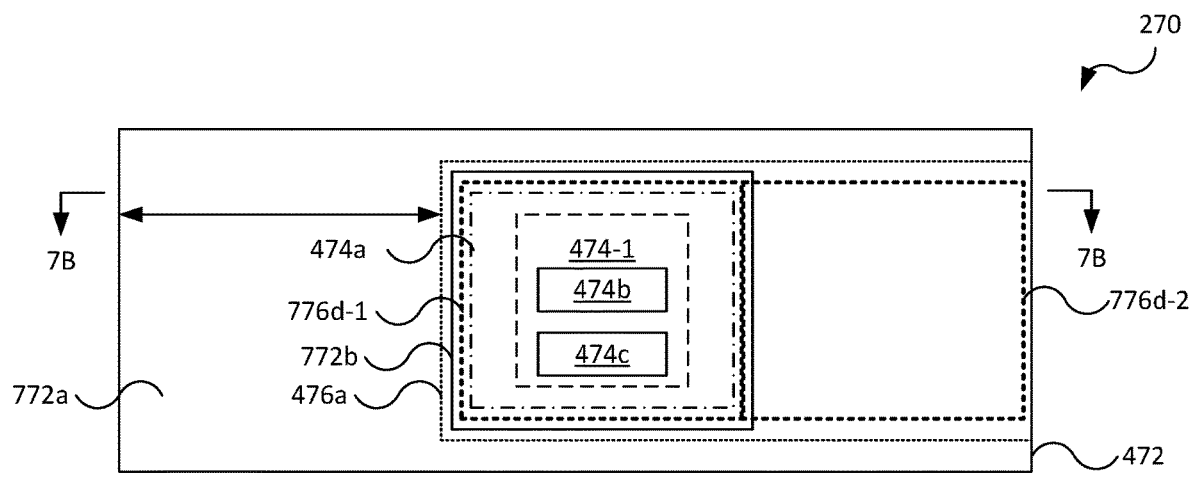
FIG. 7A is a front view of a variation of the optical sensing system of FIG. 4A.
Figure 7B:
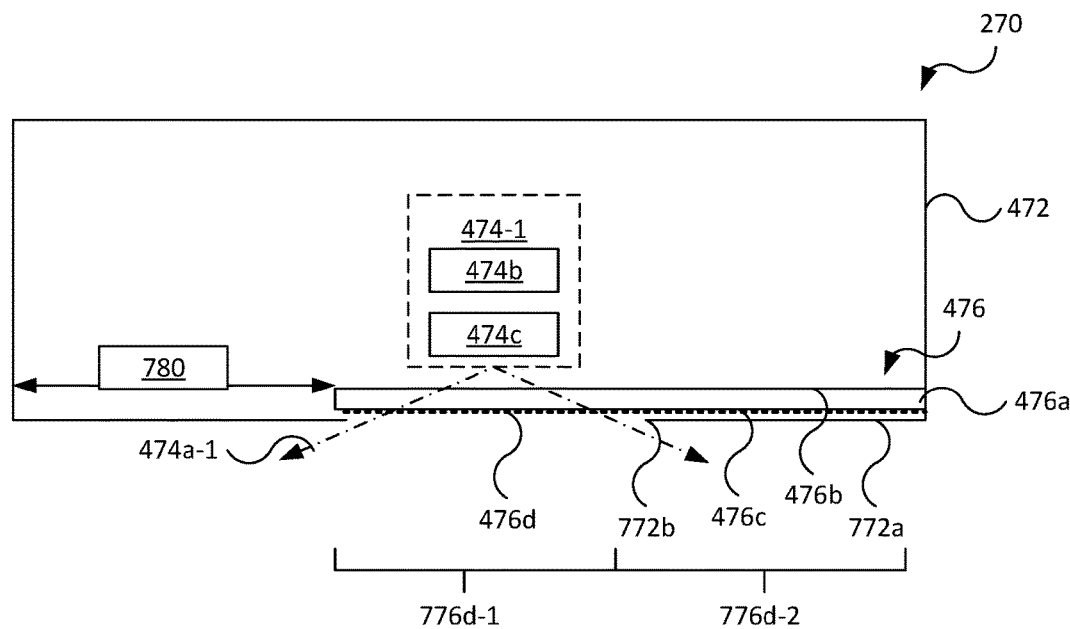
FIG. 7B is a cross-sectional view of the optical sensing system of FIG. 7A taken along line 7B-7B.

In a still further example shown in FIGS. 7A and 7B, the sensing window 476 is movable relative to the optical sensor 474 between a first position and a second position, as illustrated by the arrows in FIGS. 7A and 7B. The substrate 476a is depicted in light dot-dot lines in FIG. 7A and solid lines in FIG. 7B.

In the first position, a first region 776d-1 of the superhydrophobic surface 476d coincides with the field of view 474a of the optical sensor 474 and is exposed to the environment, while a second region 776d-2 of the superhydrophobic surface 476d does not coincide with the field of view 474a of the optical sensor 474 and is not exposed to the environment. The first region 776d-1 and the second region 776d-2 may be non-overlapping. The first region 776d-1 and the second region 776d-2 of the superhydrophobic surface 476d are depicted in heavy dot-dot lines in FIG. 7A and are indicated by brackets in FIG. 7B. In the second position, the substrate 476a is moved relative to the first position, such that the first region 776d-1 of the superhydrophobic surface 476d does not coincide with the field of view 474a of the optical sensor 474 and may or may not exposed to the environment, while the second region 776d-2 of the superhydrophobic surface 476d coincides with the field of view 474a of the optical sensor 474 and is exposed to the environment.

The chassis 472 may include a cover 772a (e.g., a plate or other structure) having an aperture 772b through which the field of view 474a extends. In the first position, the first region 776d-1 of the superhydrophobic surface 476d is aligned with the aperture 772b and exposed to the environment, while the second region 776d-2 of the superhydrophobic surface 476d is protected from the environment by the cover 772a. In the second position, the second region 776d-2 of the superhydrophobic surface 476d is aligned with the aperture 772b and exposed to the environment.

The sensing window 476 may be moveable between the first position and the second position manually (e.g., by a person) or by a movement mechanism (e.g., a motorized device). It should be noted that the sensing window 476 may include still further regions of the superhydrophobic surface 476d and be movable to further corresponding positions, as described above with respect to the first region 776d-1 and the second regions 776d-2 and the first and second positions.

The control system 150 may be further configured to detect debris on the sensor window 476. For example, the control system 150 may be configured to detect debris with image recognition (e.g., water drops) or by identifying debris as an object but which does not move in a manner consistent with movement of the vehicle 100. For example, the control system 150 may determine that an object is debris when the vehicle 100 changes directions (e.g., turns left or right), while the object remains in a fixed position within the field of view 474a. In response to determining that debris is present, the control system 150 may provide a notification to an operator or passenger (e.g., visually or audibly) indicating that the sensor window 476 requires cleaning or replacing or, in the case of the stack 678 of the films 578, that the outermost film 578 should be removed. Alternatively, in the case of the sensing window 476 being movable, the control system 150 may operate the movement mechanism 780 (depicted schematically), such as a motor-operated lead screw or solenoid, to move the sensing window 476 between the first and second positions.

As described above, one aspect of the present technology is the gathering and use of data available from various sources for operating a vehicle to carry a passenger to a destination. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to operate the vehicle to carry a person to predetermined destinations. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, carrying a passenger to a destination the present technology can be configured to allow users to select to "opt in" or "opt out" of participation in the collection of personal information data during registration for services or anytime thereafter. In another example, users can select not to provide preferred destinations. In yet another example, users can select to limit the length of time destination information is maintained. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, destinations may be provided on a one-time basis by the passenger based on non-personal information data or a bare minimum amount of personal information, such as the content being requested by the device associated with a user, other non-personal information available, or publicly available information.

What is claimed is:

1. A vehicle comprising:
   a vehicle body;
   a drive system coupled to the vehicle body for propelling the vehicle along a surface;
   a sensing system comprising:
     an optical sensor coupled to the vehicle and configured to sense with electromagnetic radiation an environment external to the vehicle body of the vehicle; and
     a sensing window coupled to the vehicle and through which the electromagnetic radiation passes from the environment to the optical sensor to be sensed thereby, the sensing window having an inner side that faces toward the optical sensor and an outer side that faces away from the optical sensor and that includes a superhydrophobic surface that is in fluidic communication with the environment and that includes a micro-scale or a nano-scale texture; and
   a control system that operates the drive system according to the optical sensor.

2. The vehicle according to claim 1, wherein the superhydrophobic surface has a contact angle with water of at least 150 degrees;
   wherein the sensing window includes a substrate that is substantially transparent to the electromagnetic radiation in a sensing range in which the optical sensor senses the environment and that includes the outer side; and
   wherein the sensing system is coupled to the vehicle body outside a passenger compartment of the vehicle body, the sensing window being separate from any window through which passengers may view the environment from the passenger compartment.

3. The vehicle according to claim 1, wherein the optical sensor has a field of view that extends through the sensing window, and the superhydrophobic surface encompasses the field of view.

4. The vehicle according to claim 3, comprising another optical sensor coupled to the vehicle body and configured to sense the environment by receiving electromagnetic radiation through the sensing window.

5. The vehicle according to claim 4, wherein the other optical sensor senses the environment with electromagnetic radiation in a different sensing range than the optical sensor.

6. The vehicle according to claim 5, wherein the other optical sensor has another field of view that the superhydrophobic surface encompasses.

7. The vehicle according to claim 6, wherein the optical sensor has a sensing range in a visible light spectrum, and the field of view of the optical sensor passes through an area of the sensing window having a first optical coating that provides a first optical property that corresponds to the sensing range; and wherein the other optical sensor has another sensing range in an infrared spectrum, and the other field of view of the other optical sensor passes through another area of the sensing window having a second optical coating that provides a second optical property that is different from the first optical property and that corresponds to the other sensing range.

8. The vehicle according to claim 3, wherein the sensing window is curved.

9. The vehicle according to claim 1, wherein the sensing window includes a substrate formed of a silica glass, and the superhydrophobic surface is formed in the substrate.

10. The vehicle according to claim 1, wherein the sensing window includes a substrate that is substantially transparent to the electromagnetic radiation in a sensing range in which the optical sensor senses the environment and that includes the outer side, and the superhydrophobic surface is formed by a coating on the outer side.

11. The vehicle according to claim 1, wherein the sensing window includes a substrate that is substantially transparent to the electromagnetic radiation in a sensing range in which the optical sensor senses the environment and that includes the outer side, and includes a film coupled to the outer side of the substrate, the film including the superhydrophobic surface.

12. The vehicle according to claim 11, wherein the film is more flexible than the substrate.

13. The vehicle according to claim 1, wherein the sensing window includes a first area and a second area that is non-overlapping with the first area, and the sensing window is movable relative to the optical sensor so that the optical sensor receives the electromagnetic radiation through the first area or the second area.

14. The vehicle according to claim 13, wherein the sensing system includes a cover having an aperture through which the optical sensor receives electromagnetic radiation to sense the environment, the first area and the second area include the superhydrophobic surface, and the sensing window is movable relative to the aperture between a first position in which the optical sensor receives the electromagnetic radiation through the first area and a second position in which the optical sensor receives the electromagnetic radiation through the second area but not the first area.

15. A sensing system for sensing an environment exterior to a vehicle, the sensing system comprising:

a housing coupleable to the vehicle;

an optical sensor coupled to the housing for receiving electromagnetic radiation to sense the environment; and a sensing window coupled to the housing and through which the optical sensor receives the electromagnetic radiation, the sensing window having a first surface that faces the optical sensor and a second surface having a superhydrophobic surface that faces the environment, wherein the superhydrophobic surface has a contact angle with water of at least 150 degrees.

16. The sensing system according to claim 15, wherein the optical sensor has a sensing range in an infrared spectrum.

17. The sensing system according to claim 16, wherein the optical sensor includes an optical sensing device that senses electromagnetic radiation from the environment in the sensing range and an optical illuminating device that emits electromagnetic radiation in the sensing range to the environment.

18. The sensing system according to claim 17, wherein the sensing window includes an optical coating on the first surface.

19. The sensing system according to claim 15, wherein the sensing window is movable relative to the optical sensor.

20. An optical sensing system comprising:

an optical sensor coupled to a chassis;

a sensing window coupled to the chassis and through which electromagnetic radiation passes from an environment to the optical sensor; and a plurality of films that are coupled to each other to form a stack that is coupled to an outer side of the sensing window, each of the films having a superhydrophobic surface that faces away from the optical sensor toward the environment, wherein the superhydrophobic surface of an outermost one of the films is exposed to the environment, and the outermost one of the films is removable from the stack so that an underlying one of the films becomes the outermost one of the films.

21. The optical sensing system according to claim 20, wherein the superhydrophobic surface has a contact angle with water of at least 150 degrees.

* * * * *